US007562598B2

(12) United States Patent
Falzoni

(10) Patent No.: US 7,562,598 B2
(45) Date of Patent: Jul. 21, 2009

(54) SEVEN-GEAR GEARBOX FOR A MOTORCAR DOUBLE CLUTCH TRANSMISSION

(75) Inventor: Gianluigi Falzoni, Turin (IT)

(73) Assignee: Graziano Trasmissioni S.p.A., Rivoli (Torino) (IT)

( * ) Notice: Subject to any disclaimer, the term of this patent is extended or adjusted under 35 U.S.C. 154(b) by 322 days.

(21) Appl. No.: 11/682,060

(22) Filed: Mar. 5, 2007

(65) Prior Publication Data

US 2007/0144286 A1 Jun. 28, 2007

(51) Int. Cl.
*F16H 3/08* (2006.01)
(52) U.S. Cl. ........................................ 74/331
(58) Field of Classification Search ................ None
See application file for complete search history.

(56) References Cited

U.S. PATENT DOCUMENTS

| | | | |
|---|---|---|---|
| 4,461,188 A | 7/1984 | Fisher | |
| 4,771,648 A | 9/1988 | Bardoll | |
| 5,996,754 A | 12/1999 | Reed, Jr. et al. | |
| 7,258,033 B2* | 8/2007 | Baldascini et al. | 74/331 |
| 7,472,617 B2* | 1/2009 | Nicklass | 74/340 |
| 2003/0145671 A1 | 8/2003 | Hedman | |
| 2008/0202267 A1* | 8/2008 | Hendrickson et al. | 74/331 |

FOREIGN PATENT DOCUMENTS

| | | |
|---|---|---|
| DE | 198 21 164 A1 | 11/1999 |
| DE | 103 10 471 A1 | 10/2003 |
| EP | 1 245 863 A2 | 10/2002 |
| FR | 2 846 064 | 4/2004 |

OTHER PUBLICATIONS

A different automatic; Jost; BNSDOC ID:XP-001174593.

* cited by examiner

*Primary Examiner*—Dirk Wright
(74) *Attorney, Agent, or Firm*—Sughrue Mion, PLLC

(57) ABSTRACT

The gearbox comprises: a first inner input shaft (10) which carries driving gearwheels (21, 23, 27) associated to the odd gears (I, III, V, VII) and fast for rotation therewith; a second outer input shaft (12) which is coaxial with the first and carries driving gearwheels (22, 24) associated to the even gears (II, IV, VI) and to the reverse gear (R) and fast for rotation therewith; and first and second output shafts (14, 16) carrying idle driven gearwheels (31-38). A first driving gearwheel (21) meshes only with the driven gearwheel (31) of first gear (I); a second driving gearwheel (23) meshes both with the driven gearwheel (33) of third gear (III) and with the driven gearwheel (35) of fifth gear (V); a third driving gearwheel (27) meshes only with the driven gearwheel (37) of seventh gear (VII); a fourth driving gearwheel (24) meshes both with the driven gearwheel (34) of fourth gear (IV) and with the driven gearwheel (36) of sixth gear (VI); and a fifth driving gearwheel (22) meshes with the driven gearwheel (32) of second gear (II) and, via this latter, with the driven gearwheel (38) of reverse gear (R).

16 Claims, 4 Drawing Sheets

SEVEN-GEAR GEARBOX FOR A MOTORCAR DOUBLE CLUTCH TRANSMISSION

BACKGROUND OF THE INVENTION

The present invention relates to a seven-gear gearbox for a motorcar double clutch transmission, having the characteristics specified in the preamble of claim 1.

A seven-gear gearbox for a motorcar double clutch transmission as defined above is known from DE10310471.

SUMMARY OF THE INVENTION

It is an object of the present invention to provide a gearbox of the above-mentioned type, which has a more compact structure, in particular a smaller axial size, and which can be easily adapted with few changes to motor vehicles of different performances.

This and other objects are fully achieved according to the invention by means of a gearbox having the characteristics set forth in the characterising portion of claim 1.

Further advantageous characteristics of the invention are set forth in the dependent claims.

Since the second and reverse gears, the fourth and sixth gears, and the third and fifth gears are shared, that is, they share two by two the same driving gearwheel, the gearbox has a small axial size. Moreover, since the first gear and the seventh gear, if present, are not shared, it is possible to replace easily, without being it necessary to redesign the whole gearbox architecture, the gear pair of first gear and the gear pair of seventh gear in order to adapt the gearbox to the specific required application.

For instance, depending upon the applications the seventh gear can be set as the gear in which the motor vehicle reaches the maximum speed or as the gear in which the motor vehicle has its smallest fuel consumption, without being it necessary to intervene on the remaining gear ratios of the gearbox. In the same way, in order to adapt the gearbox to different requirements of the motor vehicle in terms of starting acceleration and/or maximum climbable gradient, it suffices to modify only the gear pair of first gear.

BRIEF DESCRIPTION OF THE DRAWINGS

Further characteristics and advantages of the invention will become apparent from the detailed description which follows, given purely by way of non-limiting example with reference to the appended drawings, in which.

DETAILED DESCRIPTION OF THE PREFERRED EMBODIMENTS

The gear sets corresponding to the different forward gears of the transmission are indicated in the figure by the Roman numerals I, II, III, IV, V, VI and VII, for the first, second, third, fourth, fifth, sixth and seventh gears, respectively, while the gear set of reverse gear is indicated by the letter R.

Figure 1:
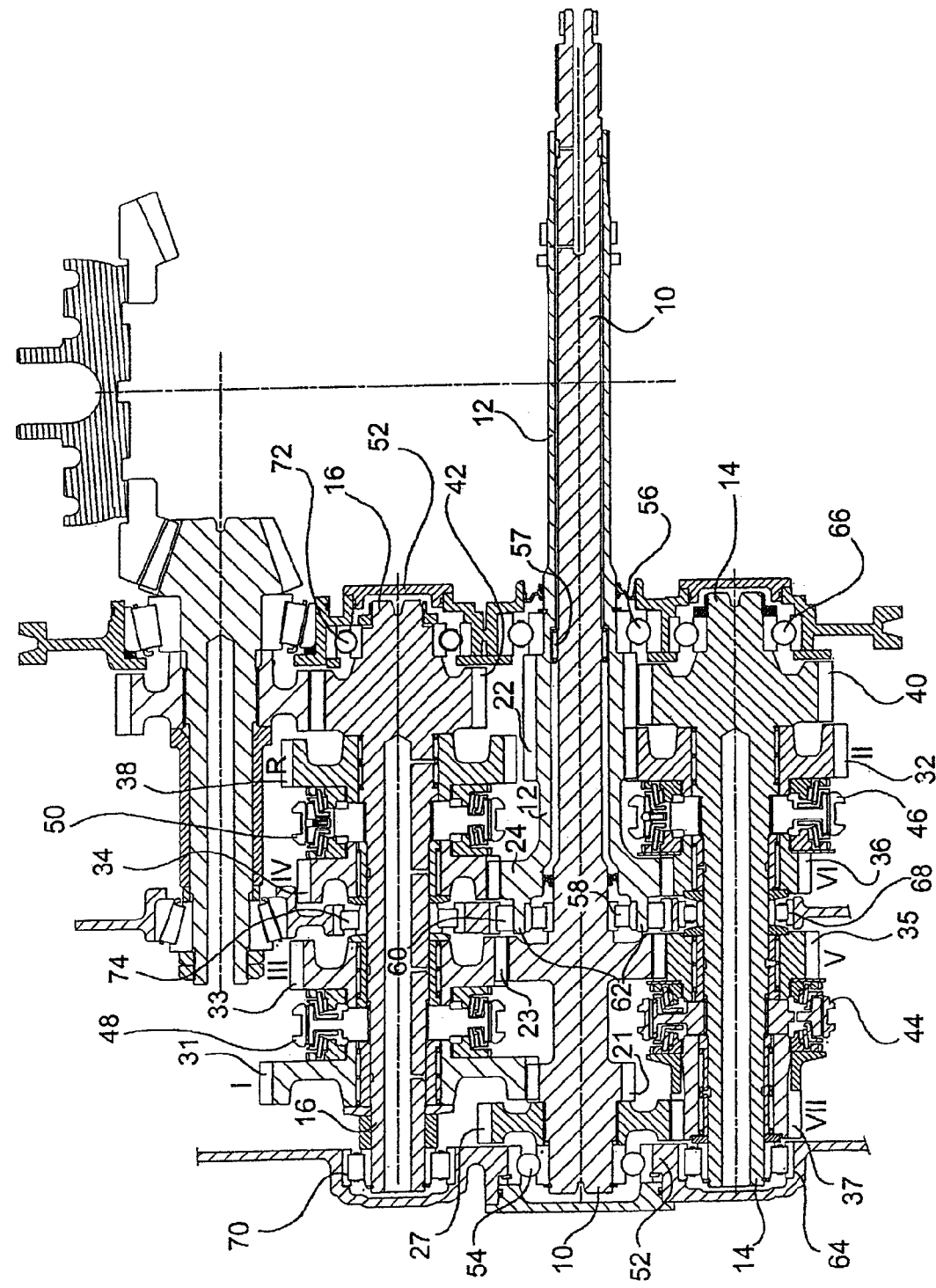
FIG. 1 is a section view of a seven-gear gearbox for a motorcar double clutch transmission according to a preferred embodiment of the invention.

With reference first to FIG. 1, a seven-gear gearbox for a motorcar double clutch transmission, intended in particular to be used in high-performance motor vehicles, basically comprises:

a first inner input shaft 10, which can be coupled for rotation to a drive shaft of the vehicle (not illustrated) by means of a first friction clutch (not illustrated), said drive shaft and said first friction clutch being arranged on the right-hand side of the gearbox relative to an observer of FIG. 1;

a second outer input shaft 12, which is arranged coaxial with the first input shaft 10 and can be coupled for rotation to the drive shaft of the vehicle by means of a second friction clutch (not illustrated), also arranged on the right-hand side of the gearbox relative to the observer of FIG. 1; and a first output shaft 14 and a second output shaft 16, arranged parallel to the two input shafts 10 and 12.

The first input shaft 10 carries, in the order from left to right relative to the point of view of an observer of FIG. 1, a driving gearwheel 27 associated to the seventh gear, a driving gearwheel 21 associated to the first gear and a driving gearwheel 23 associated to the third and the fifth gears. In the illustrated embodiment, the three driving gearwheels 21, 23 and 27 mounted on the first input shaft 10 are all fast for rotation with this shaft. Moreover, the two gearwheels 21 and 23 are formed as a single piece with the shaft 10.

The second input shaft 12 carries, in the order from left to right relative to the point of view of an observer of FIG. 1, a driving gearwheel 24 associated to the fourth and sixth gears and a driving gearwheel 22 associated to the second gear and to the reverse gear. In the illustrated embodiment, the driving gearwheels 22 and 24 mounted on the second input shaft 12 are both fast for rotation with this shaft and are also formed as a single piece therewith.

The first output shaft 14 carries, in the order from left to right relative to the point of view of an observer of FIG. 1, a driven gearwheel 37 permanently meshing with the driving gearwheel 27 carried by the first input shaft 10 to realize the seventh gear, a driven gearwheel 35 permanently meshing with the driving gearwheel 23 carried by the first input shaft 10 to realize the fifth gear, a driven gearwheel 36 permanently meshing with the driving gearwheel 24 carried by the second input shaft 12 to realize the sixth gear, a driven gearwheel 32 permanently meshing with the driving gearwheel 22 carried by the second input shaft 12 to realize the second gear and also acting as intermediate wheel of the gear set of reverse gear, and a final reduction pinion 40.

The driven gearwheels 37, 35, 36 and 32 are idly mounted on the first output shaft 14, whereas the final reduction pinion 40 is fast for rotation with this shaft. A first coupling sleeve 44 of a multi-cone synchroniser is mounted on the first output shaft 14 between the two idle driven wheels 37 and 35 and is selectively movable to the left or to the right to couple the wheel 37 or the wheel 35, respectively, to the shaft 14, thereby engaging the seventh gear or the fifth gear, respectively. A second coupling sleeve 46 of a multi-cone synchroniser is mounted on the first output shaft 14 between the two idle driven wheels 36 and 32 and is selectively movable to the left or to the right to couple the wheel 36 or the wheel 32, respectively, to the shaft 14, thereby engaging the sixth gear or the second gear, respectively.

The second output shaft 16 carries, in the order from left to right relative to the point of view of an observer of FIG. 1, a driven gearwheel 31 permanently meshing with the driving gearwheel 21 carried by the first input shaft 10 to realize the first gear, a driven gearwheel 33 permanently meshing with the driving gearwheel 23 carried by the first input shaft 10 to realize the third gear, a driven gearwheel 34 permanently meshing with the driving gearwheel 24 carried by the second input shaft 12 to realize the fourth gear, a driven gearwheel 38 permanently meshing with the gearwheel 32 carried by the first output shaft 14 to realize the reverse gear, and a final reduction pinion 42.

The driven gearwheels 31, 33, 34 and 38 are idly mounted on the second output shaft 16, whereas the final reduction pinion 42 is fast for rotation with this shaft. A third coupling sleeve 48 of a multi-cone synchroniser is mounted on the second output shaft 16 between the two idle driven wheels 31 and 33 and is selectively movable to the left or to the right to couple the wheel 31 or the wheel 33, respectively, to the shaft 16, thereby engaging the first gear or the third gear, respectively. A fourth coupling sleeve 50 of a multi-cone synchroniser is mounted on the second output shaft 16 between the two idle driven wheels 34 and 38 and is selectively movable to the left or to the right to couple the wheel 34 or the wheel 38, respectively, to the shaft 16, thereby engaging the fourth gear or the reverse gear, respectively.

In the embodiment illustrated in FIG. 1, the assembly of the two input shafts 10 and 12 is mounted on a gear case 52 (only partially shown) by means of three axially spaced supports, namely:

a first end support comprising a ball bearing 54 fitted between the gear case 52 and an end portion of the first input shaft 10 opposite the input/output side of the gearbox;

a second end support comprising a ball bearing 56, fitted between the gear case 52 and a portion of the second input shaft 12 facing the input/output side of the gearbox and adjacent the driving gearwheel 22, and a roller cage 57 radially interposed between the two input shafts 10 and 12 in a position essentially axially aligned or superimposed with respect to the ball bearing 56; and a third intermediate support comprising a pair of roller bearings 58 and 60 axially aligned or superimposed, placed at the end of the second input shaft 12 opposite the input/output side of the gearbox, essentially equally spaced from the first and the second bearing, wherein the roller bearing 58 is radially interposed between the first input shaft 10, next to the driving gearwheel 23, and an annular projection 62 formed by the second input shaft 12, while the roller bearing 60 is radially interposed between the annular projection 62 and a portion of the gear case 52.

The radial loads acting on the two input shafts 10 and 12 are born by all the above-mentioned bearings, while the two ball bearings 54 and 56 bear also the axial loads, in addition to the radial loads.

Since three supporting points are provided, the gearbox is capable of satisfying any requirement of maximum torque in view of its use on high-performance vehicles. Moreover, by virtue of the particular superimposed arrangement of the two roller bearings 58 and 60 forming the intermediate support of the two input shafts 10 and 12, the gearbox has yet a small axial size.

Also the two output shafts 14 and 16 are each supported by means of three supports, which are axially aligned or superimposed with the supports of the two input shafts 10 and 12. More specifically, the first output shaft 14 is supported at its ends by means of a roller bearing 64 and a ball bearing 66, axially aligned or superimposed with the end bearings 54 and 56, respectively, of the two input shafts 10 and 12, and in its intermediate portion by means of a roller bearing 68, axially aligned or superimposed with the two intermediate bearings 58 and 60 of the input shafts 10 and 12. In the same way, the second output shaft 16 is supported at its ends by means of a roller bearing 70 and a ball bearing 72, axially aligned or superimposed with the end bearings 54 and 56, respectively, of the two input shafts 10 and 12, and in its intermediate portion by means of a roller bearing 74, axially aligned or superimposed with the two intermediate bearings 58 and 60 of the input shafts 10 and 12.

Figure 2:
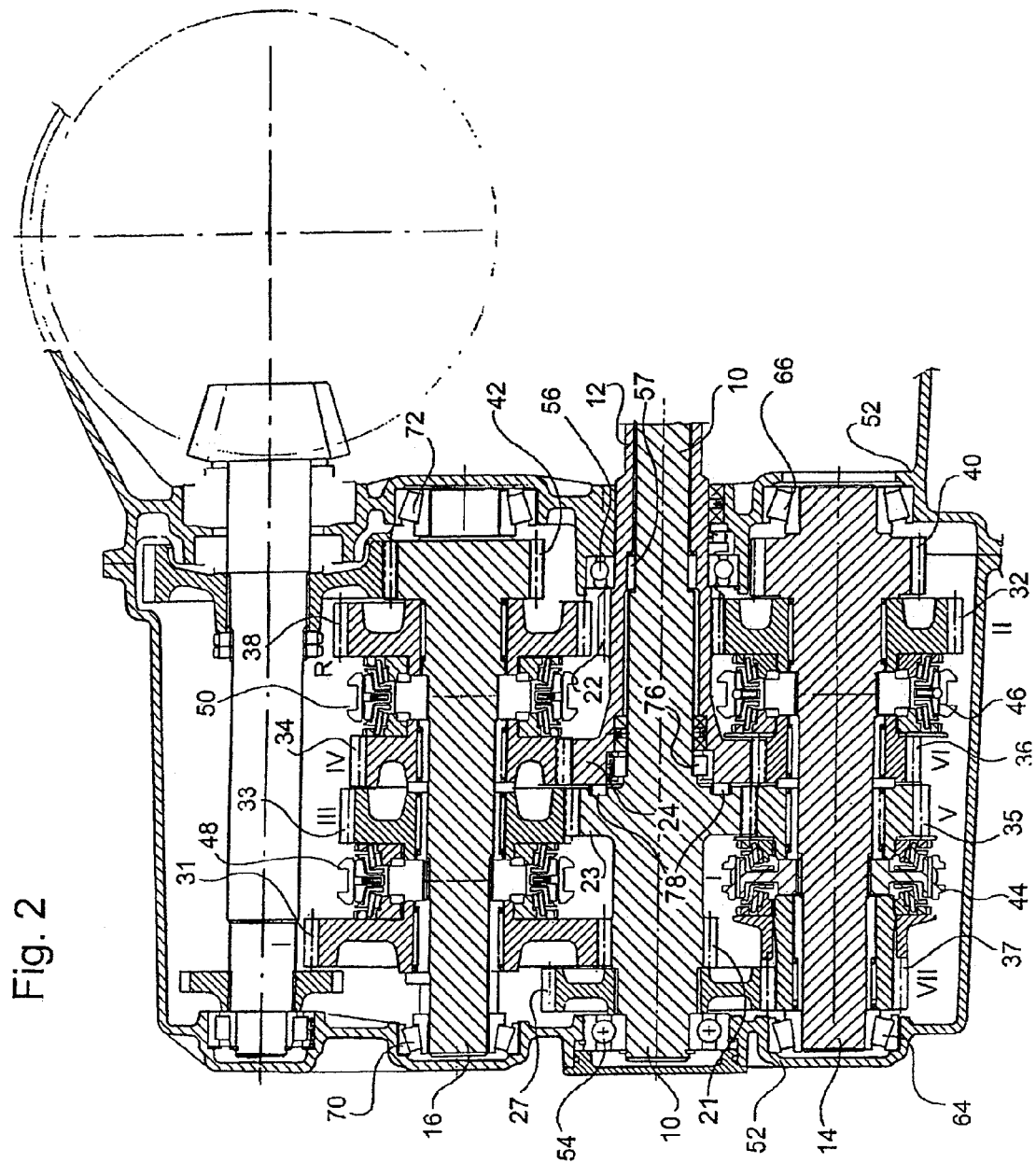
FIG. 2 is a section view of a second embodiment of a seven-gear gearbox for a motorcar double clutch transmission according to the invention.

A second embodiment of the invention is illustrated in FIG. 2, where parts and elements identical or corresponding to those of FIG. 1 have been given the same reference numerals.

This second embodiment differs from the first substantially only in the way of supporting the two input shafts 10 and 12 and the two output shafts 14 and 16.

In this case, in fact, the assembly of the two input shafts 10 and 12 is supported by the gear case 52 only by means of two end supports, comprising a ball bearing 54 fitted on an end portion of the first input shaft 10 opposite the input/output side of the gearbox and a ball bearing 56 fitted on a portion of the second input shaft 12 adjacent the input/output side of the gearbox. Moreover, a roller bearing 76 is arranged in a position essentially equally spaced from the two bearings 54 and 56 and provides a mutual support between the two input shafts 10 and 12, while a roller cage 57 radially interposed between the two input shafts 10 and 12 is arranged in a position axially aligned or superimposed relative to the ball bearing 56. Finally, a roller cage 78 axially interposed between the two input shafts 10 and 12, in particular between the driving gearwheels 23 and 24, is arranged in the vicinity of the roller bearing 76 to bear the axial loads exchanged between these shafts.

The ball bearings 54 and 56 bear both the radial loads and the axial loads, the roller bearing 76 and the roller cage 57 bear the radial loads, and the roller cage 78 bears the axial loads.

The output shafts 14 and 16 are supported only at their ends by two taper roller bearings 64 and 66 and by two taper roller bearings 70 and 72, respectively, as the intermediate supports 68 and 74 have been omitted with respect to the first embodiment.

Figure 3:
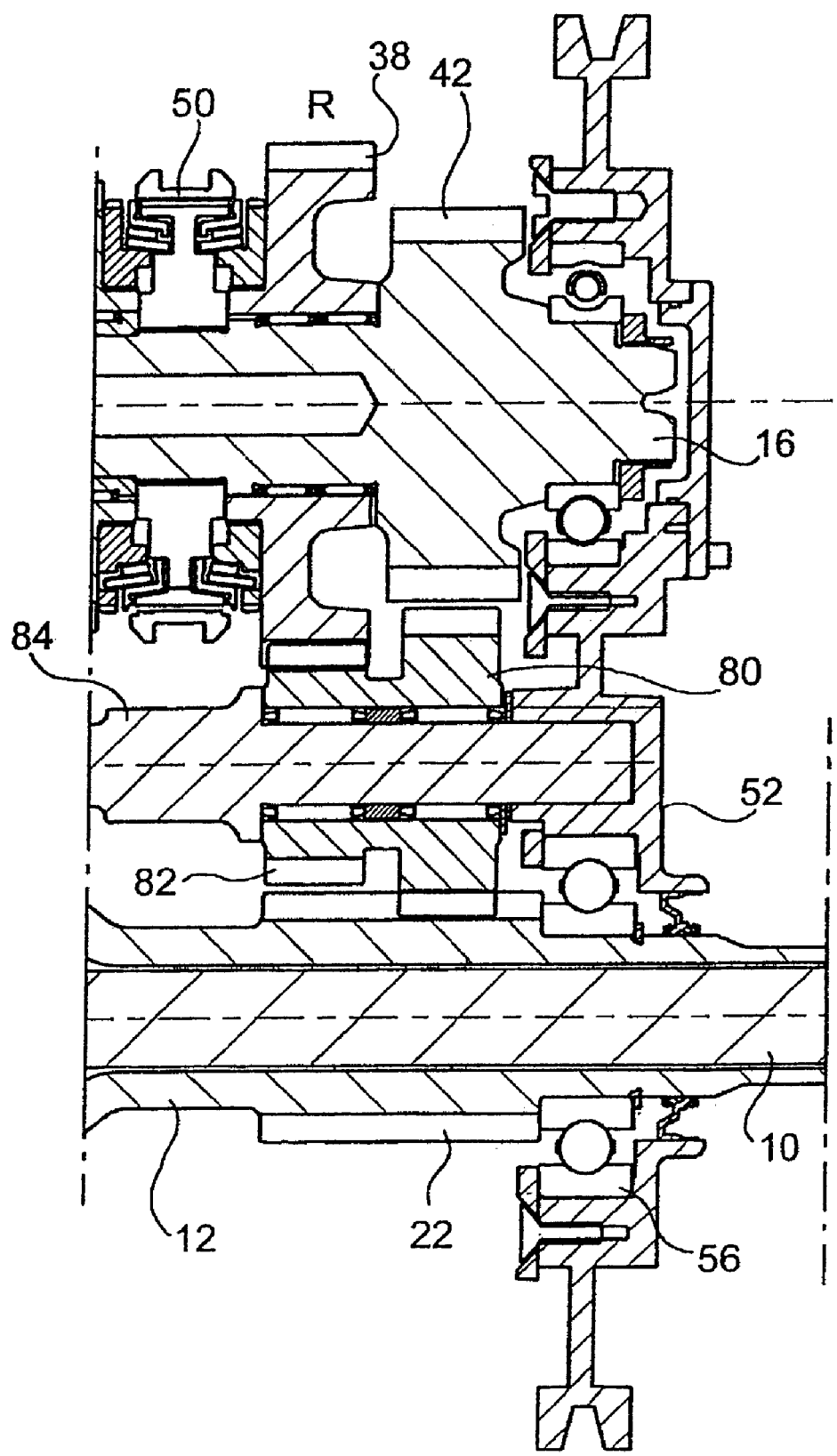
FIG. 3 is a section view of the gear set of reverse gear according to a variant of construction of the gearbox of FIG. 1.
Figure 4:
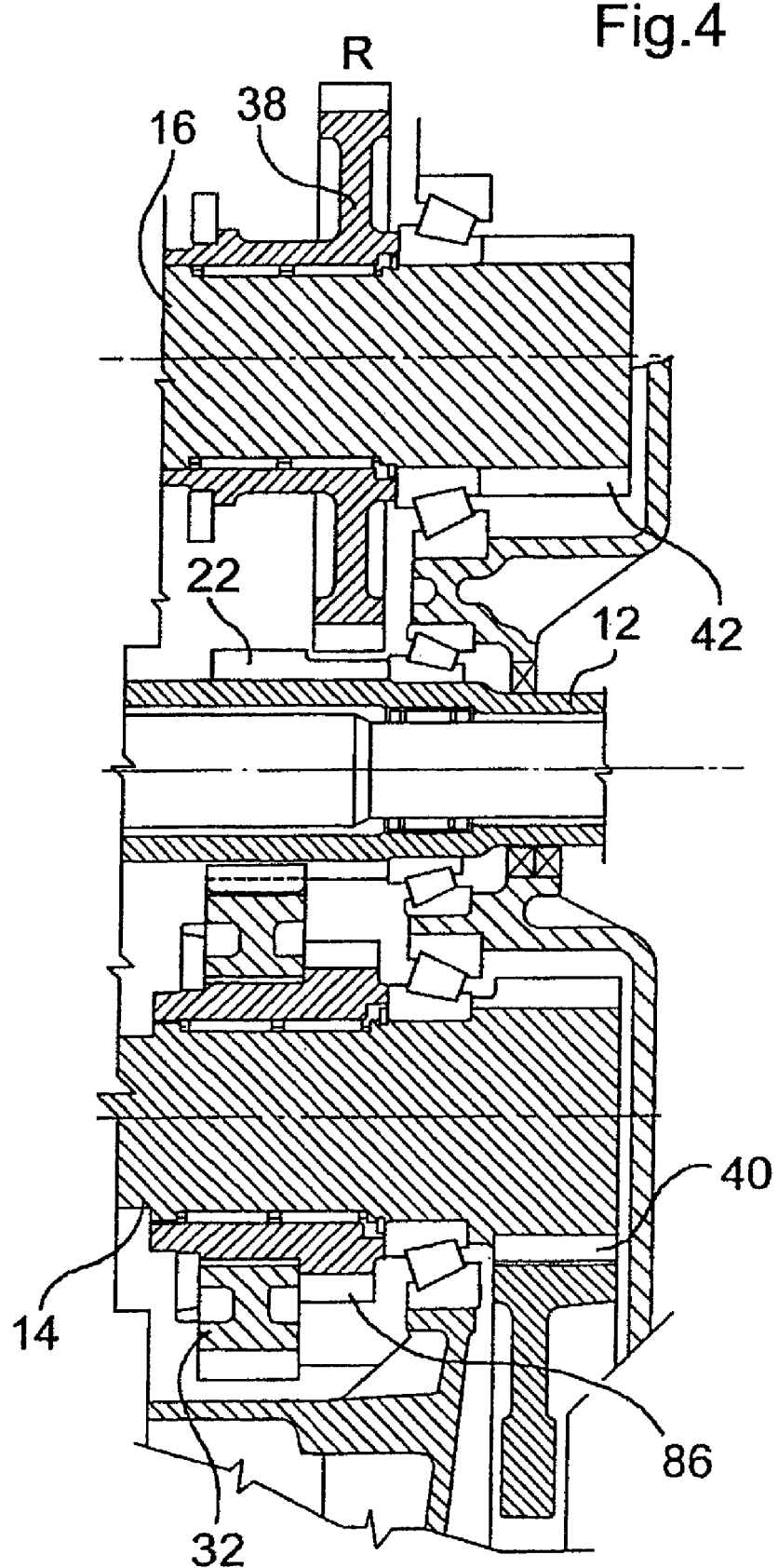
FIG. 4 is a section view of the gear set of reverse gear according to a variant of construction of the gearbox of FIG. 2.

Two variants of construction of a seven-gear gearbox for a motorcar double clutch transmission according to the invention are partially illustrated in FIGS. 3 and 4, where parts and elements identical or corresponding to those of FIGS. 1 and 2 have been given the same reference numerals. These two variants of construction differ from the first two embodiments described above substantially only in the way of arranging the gear set of reverse gear.

In particular, in the variant of construction of FIG. 3 the gear set of reverse gear is composed of the driving gearwheel 22 carried by the second input shaft 12, of a pair of gearwheels 80 and 82 drivingly connected with each other and idly mounted on a lay shaft 84, and of the driven gearwheel 38 idly mounted on the second output shaft 16. The two gearwheels 80 and 82, which permanently mesh with the driving gearwheel 22 and with the driven gearwheel 38, respectively, thus act as idle wheels in the gear set of reverse gear.

On the other hand, in the variant of construction of FIG. 4 the gear set of reverse gear is composed of the driving gearwheel 22 carried by the second input shaft 12, of the driven gearwheel 32 of second gear, idly mounted on the first output shaft 14, of a gearwheel 86 also idly mounted on the first output shaft 14 and drivingly connected with the gearwheel 32, and of the driven gearwheel 38 idly mounted on the second output shaft 16. The two gearwheels 32 and 86, which permanently mesh with the driving gearwheel 22 and with the driven gearwheel 38, respectively, thus act as idle wheels in the gear set of reverse gear.

Naturally, the principle of the invention remaining unchanged, embodiments and manufacturing details may vary widely from those described and illustrated purely by way of non-limiting example.

For example, conical bearings could also be used wholly or partially for the bearings 54, 56, 58, 60, 64, 66, 70, 72, 76 and 78.

Moreover, the axial positions of the gear sets carried by the inner input shaft 10 could be swapped with respect to those illustrated in FIGS. 1 and 2. For example, the gear set of first gear could be switched with the gear set of seventh gear or with the gear set of third and fifth gear.

What is claimed is:

1. Seven-gear gearbox for a motorcar double clutch transmission, comprising:
   a gear case;
   a first inner input shaft (10) and a second outer input shaft (12) arranged coaxial to the first, said first and second input shafts (10, 12) being supported on the gear case (52);
   first and second output shafts (14, 16);
   a first group of driving gearwheels (21, 23, 27) carried by the first input shaft (10) so as to be drivingly connected for rotation therewith, said first group of driving gearwheels being associated to a first gear (I), to a third gear (III), to a fifth gear (V) and to a seventh gear (VII);
   a second group of driving gearwheels (22, 24) carried by the second input shaft (12) so as to be drivingly connected for rotation therewith, said second group of driving gearwheels being associated to a second gear (II), to a fourth gear (IV), to a sixth gear (VI) and to a reverse gear (R);
   a first group of driven gearwheels (32, 35, 36, 37) idly mounted on the first output shaft (14);
   a second group of driven gearwheels (31, 33, 34, 38) idly mounted on the second output shaft (16); and
   a first end support (54), a second end support (56) and a third intermediate support (58, 60) arranged to support the first and second input shafts (10, 12) on the gear case (52), wherein the first end support comprises a bearing (54) fitted between the gear case (52) and an end portion of the first input shaft (10) opposite a first side of the gearbox, wherein the second end support comprises a bearing (56) fitted between the gear case (52) and a portion of the second input shaft (12) facing the first side of the gearbox, and wherein the third intermediate support comprises a first bearing (58) radially interposed between the first and second input shafts (10, 12) and a second bearing (60) fitted between the second input shaft (12) and the gear case (52) so as to be axially aligned or superimposed with the first bearing (58).

2. The gearbox of claim 1, wherein the third intermediate support (58, 60) is placed essentially equally spaced from the first and second end supports (54, 56, 57).

3. The gearbox of claim 1, wherein the first and second end supports comprise each a ball bearing (54, 56) or a tapered roller bearing.

4. The gearbox of claim 1, wherein the bearings (58, 60) forming the third intermediate support are ball bearings or roller bearings.

5. The gearbox of claim 1, further comprising a roller cage (57) radially interposed between the first and second input shafts (10, 12) in axially aligned or superimposed arrangement relative to the bearing (56) of the second end support.

6. The gearbox of claim 1, wherein the first and second output shafts (14, 16) are supported on the gear case (52) each by means of a pair of end supports (64, 66, 70, 72).

7. The gearbox of claim 6, wherein the end supports (64, 66, 70, 72) of the first and second output shafts (14, 16) are axially aligned or superimposed each with a respective end support (54, 56) of the first and second input shafts (10, 12).

8. The gearbox of claim 6, wherein the end supports (64, 66, 70, 72) of the first and second output shafts (14, 16) are tapered roller bearings.

9. The gearbox of claim 6, wherein the first and second output shafts (14, 16) are also supported on the gear case (52) by means of a third intermediate support (68, 74).

10. The gearbox of claim 9, wherein the third intermediate support (68, 74) of the first and second output shafts (14, 16) is axially aligned or superimposed with the third intermediate support of the first and second input shafts (10, 12).

11. The gearbox of claim 1, wherein
   the first group of driving gearwheels includes a first driving gearwheel (21) associated to the first gear (I), a second driving gearwheel (23) associated both to the third gear (III) and to the fifth gear (V), and a third driving gearwheel (27) associated to the seventh gear (VII);
   the second group of driving gearwheels includes a fourth driving gearwheel (22) associated both to the second gear (II) and to the reverse gear (R), and a fifth driving gearwheel (24) associated both to the fourth gear (IV) and to the sixth gear (VI);
   the first group of driven gearwheels includes a first driven gearwheel (37) meshing with the third driving gearwheel (27) to realize the seventh gear (VII), a second driven gearwheel (35) meshing with the second driving gearwheel (23) to realize the fifth gear (V), a third driven gearwheel (36) meshing with the fifth driving gearwheel (24) to realize the sixth gear (VI), and a fourth driven gearwheel (32) meshing with the fourth driving gearwheel (22) to realize the second gear (II); and
   the second group of driven gearwheels includes a fifth driven gearwheel (31) meshing with the first driving gearwheel (21) to realize the first gear (I), a sixth driven gearwheel (33) meshing with the second driving gearwheel (23) to realize the third gear (III), a seventh driven gearwheel (34) meshing with the fifth driving gearwheel (24) to realize the fourth gear (IV), and an eighth driven gearwheel (38) arranged to be driven to rotate by the fourth driving gearwheel (22) to realize the reverse gear (R).

12. The gearbox of claim 11, wherein the eighth driven gearwheel (38) meshes with the fourth driven gearwheel (32) in such a manner that upon engagement 6f the reverse gear (R) the driving torque is transmitted from the fourth driving gearwheel (22) to the fourth driven gearwheel (32) and from this one to the eighth driven gearwheel (38).

13. The gearbox of claim 11, further comprising a lay shaft (84) on which are idly mounted first and second intermediate gearwheels of reverse gear (80, 82), fast for rotation with each other, wherein the first intermediate gearwheel (80) permanently meshes with the fourth driving gearwheel (22) and the second intermediate gearwheel (82) permanently meshes with the eighth driven gearwheel (38).

14. The gearbox of claim 11, further comprising an intermediate gearwheel of reverse gear (86) which is idly mounted on the first output shaft (14), is fast for rotation with the fourth driven gearwheel (32) and permanently meshes with the eighth driven gearwheel (38).

15. The gearbox according of claim 11, further comprising:
a first coupling sleeve (44) of a synchroniser, arranged to couple selectively the first and second driven gearwheels (37, 35) for rotation with the first output shaft (14) to engage the seventh gear (VII) or the fifth gear (V), respectively;
a second coupling sleeve (46) of a synchroniser, arranged to couple selectively the third and fourth driven gearwheels (36, 32) for rotation with the first output shaft (14) to engage the sixth gear (VI) or the second gear (II), respectively;
a third coupling sleeve (48) of a synchroniser, arranged to couple selectively the fifth and sixth driven gearwheels (31, 33) for rotation with the second output shaft (16) to engage the first gear (I) or the third gear (III), respectively; and
a fourth coupling sleeve (50) of a synchroniser, arranged to couple selectively the seventh and eighth driven gearwheels (34, 38) for rotation with the second output shaft (16) to engage the fourth gear (IV) or the reverse gear (R), respectively.

16. The gearbox of claim 11, wherein the first and third driving gearwheels (21, 27) are arranged adjacently at an and of the first input shaft (10) opposite the first side of the gearbox.

* * * * *